(12) United States Patent
Wolford et al.

(10) Patent No.: US 9,757,684 B2
(45) Date of Patent: *Sep. 12, 2017

(54) CATALYST-FREE REMOVAL OF $NO_x$ AND OTHER CONTAMINANTS FROM COMBUSTION EXHAUSTS USING INTENSE PULSED ELECTRON BEAMS

(71) Applicant: The United States of America, as represented by the Secretary of the Navy, Washington, DC (US)

(72) Inventors: Matthew F. Wolford, Woodbridge, VA (US); Matthew C. Myers, Beltsville, MD (US); John D. Sethian, Burke, VA (US); Frank Hegeler, Vienna, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,768

(22) Filed: Sep. 6, 2016

(65) Prior Publication Data
US 2017/0087509 A1    Mar. 30, 2017

Related U.S. Application Data

(60) Provisional application No. 62/232,482, filed on Sep. 25, 2015.

(51) Int. Cl.
*B01J 19/08*    (2006.01)
*B01D 53/32*    (2006.01)
(Continued)

(52) U.S. Cl.
CPC ............. *B01D 53/32* (2013.01); *B01D 53/56* (2013.01); *B01D 53/92* (2013.01); *B01J 19/081* (2013.01);
(Continued)

(58) Field of Classification Search
CPC ........ B01D 53/32; B01D 53/56; B01D 53/92; B01D 2259/812; B01J 19/081; B01J 19/085
(Continued)

(56) References Cited

U.S. PATENT DOCUMENTS

| 3,925,670 A | 12/1975 | Farrell et al. |
| 3,997,415 A | 12/1976 | Machi et al. |

(Continued)

OTHER PUBLICATIONS

"Accelerators for Americas Future," Symposium Proceedings, Walter Henning and Charles Shank Charis. Published by US Department of Energy, Jun. 2010.
(Continued)

*Primary Examiner* — Keith Hendricks
*Assistant Examiner* — Colleen M Raphael
(74) *Attorney, Agent, or Firm* — U.S. Naval Research Laboratory; Joslyn Barritt

(57) ABSTRACT

An improved process and for removing $NO_x$ from exhaust gases produced by combustion-based energy sources. Catalyst-free exhaust gas is directed into one or more ducts. The gas is cooled and then passes through the duct, wherein the gas flow rate and the electron beam pulse rate are configured to cause each successive volume of gas that flows past the window to be subjected to only a single electron beam pulse in the reaction chamber. A single short, intense electron beam is fired into the exhaust through a window in the reaction chamber as the exhaust flows past the window, with some of the electrons being reflected back into the gas by a reflective plate situated opposite the window. The deposited electron energy causes $NO_x$ from the exhaust to be converted into $N_2$ and $O_2$ which are output into the atmosphere with the thus-scrubbed exhaust.

16 Claims, 13 Drawing Sheets

(51) Int. Cl.
  *B01D 53/92* (2006.01)
  *B01D 53/56* (2006.01)
(52) U.S. Cl.
  CPC ....... *B01J 19/085* (2013.01); *B01D 2257/404* (2013.01); *B01D 2258/012* (2013.01); *B01D 2258/0283* (2013.01); *B01D 2259/812* (2013.01)
(58) Field of Classification Search
  USPC ............ 204/157.3, 157.44, 157.46; 422/168, 422/186–187
  See application file for complete search history.

(56) References Cited

U.S. PATENT DOCUMENTS

| | | | |
|---|---|---|---|
| 5,210,426 | A | 5/1993 | Itoh et al. |
| 5,397,444 | A | 3/1995 | Zimek et al. |
| 5,695,616 | A | 12/1997 | Helfritch et al. |
| 5,744,811 | A | 4/1998 | Schonberg et al. |
| 5,891,409 | A * | 4/1999 | Hsiao ................ B01D 53/323 60/274 |
| 5,893,267 | A * | 4/1999 | Vogtlin ............... B01D 53/323 60/274 |
| 6,038,854 | A * | 3/2000 | Penetrante ........... B01D 53/323 422/186.03 |
| 6,345,497 | B1 * | 2/2002 | Penetrante ............ B01D 53/92 422/186.03 |
| 7,429,761 | B2 | 9/2008 | Friedman et al. |
| 7,547,892 | B2 | 6/2009 | Avnery |
| 7,989,987 | B2 | 8/2011 | McDonald |
| 9,089,815 | B2 | 7/2015 | Sethian et al. |
| 2005/0184257 | A1 | 8/2005 | Elsheref et al. |
| 2013/0153404 | A1 | 6/2013 | Sethian et al. |
| 2014/0284203 | A1 * | 9/2014 | Medoff ................ B01J 19/085 422/186 |

OTHER PUBLICATIONS

R. Kikuchi and Y. Pelovski, "Low-dose irradiation by electron beam for the treatment of high-SOx flue gas on a semi-pilot scale—Consideration of by-product quality and approach to clean technology," Process Safety and Environment 87 (2009) 135-143.
S. Korenev and R. Johnson, "Electron accelerators for cleaning flue gases and for oil liquefaction," Proceedings of EPAC08, Genoa, Italy 2008. Paper TUPP141.
A.A. Basfar, O.I. Fageeha, N. Kunnummal, A.G. Chmielewski, J. Licki, A. Pawelec, Z. Zimek, and J. Warych, "A review on electron beam flue gas treatment (EBFGT) as a multicomponent air pollution control technology," NUKLEONIKA 2010; 55(3):271-277.
J.D. Sethian, M. Myers, Ian D. Smith, V. Carboni, J. Kishi, D. Morton, J. Pearce, B. Bowen, L. Schlitt, O. Barr, and W. Webster, "Pulsed Power for a Rep-Rate, Electron Beam Pumped, Krf Laser," IEEE Trans Plasma Sci., 28, 1333 (2000).
F. Hegeler, M.W. McGeoch, J. D. Sethian, H. D. Sanders, S.C. Glidden, M.C. Myers, Durable, Gigawatt Class Solid State Pulsed Power System, IEEE Transactions on Dielectrics and Electrical Insulation, vol. 18, Issue 4, pp. 1205-1213, Aug. 2011.
Y.K. Kwon and D.H. Han, "Microwave Effect in the Simultaneous Removal of NOx and SO2 under Electron Beam Irradiation and Kinetic Investigation of NOx Removal Rate," Ind. Eng. Chem. Res., 2010, 49 (17), pp. 8147-8156.
J.K.Kim, B.Han, Y.R.Kim, N. Doutzkinov, K. Nikolov, E-Beam Flue Gas Treatment Plant for "Sviloza Power Station" in Bulgaria—Engineering Consideration & Cost Evaluation, International Topical Meeting on Nuclear Research Applications and Utilization of Accelerators May 4-8, 2009, Vienna, Austria.
Priya R. Chalise, Yu Wang, Kamarul, Asyikin Mustafa, Masato Watanabe, Yasushi Hayashi, Akitoshi Okino, and Bild Hotta, "NOx Treatment Using Low-Energy Secondary Emission Electron Gun," IEEE Transactions on Plasma Science, Vol. 32, No. 3, Jun. 2004.
Takuro Ikegaki, Satoshi Seino, Yasuyuki Oda, Takuya Matsuda, Go Imada, Weihua Jiang and Kiyoshi Yatsui, Flue Gas Treatment by Intense Pulsed Relativistic Electron Beam, Jpn. J. Appl. Phys. vol. 40 (2001) pp. 1104-1107.
Yoshiro Nakagawa and Hiroshi Kawauchi, "NOx Removal in N2 by Pulse Intense Electron Beam Irradiation," Jpn. J. Appl. Phys. vol. 37 (1998) pp. L 91-L 93.
Search Report and Written Opinion dated Dec. 20, 2016, in corresponding PCT Application No. PCT/US2016/050343.

* cited by examiner

CATALYST-FREE REMOVAL OF NO$_x$ AND OTHER CONTAMINANTS FROM COMBUSTION EXHAUSTS USING INTENSE PULSED ELECTRON BEAMS

CROSS-REFERENCE

This application is a non-provisional of, and claims the benefit of priority under 35 U.S.C. §119 based on, U.S. Provisional Patent Application No. 62/232,482 filed on Sep. 25, 2015. The Provisional Application and all references cited herein are hereby incorporated by reference into the present disclosure in their entirety.

TECHNICAL FIELD

The present invention relates to removal of nitrogen oxides (NOx) from the exhaust gas produced by combustion-based energy sources such as coal-fired power plants, oil-fired power plants, gas turbines, diesel internal combustion engines, and gasoline-based internal combustion engines.

BACKGROUND

Nitrogen oxides (NO$_x$) are a combination of nitric oxide (NO) and nitrogen dioxide (NO$_2$) and are a natural byproduct in the combustion of all fossil fuels. NO$_x$ is formed when the nitrogen in the air chemically interacts with oxygen released by the combustion process. Sulfur oxides (SO$_x$) are also released during the combustion process. SO$_x$ is primarily composed of sulfur dioxide (SO$_2$).

NO$_x$ has several deleterious effects. In either its pure chemical or particulate form, NO$_x$ is known to present a severe health hazard to the respiratory system. In addition, NO$_x$ is the basis for acid rain, which can affect the quality of air, soil, and water and can chemically decompose man-made structures including roads, bridges and buildings. SO$_x$ is known to cause respiratory problems, visibility reduction, acid rain and corrosion.

High voltage electron beams (500,000 to 1,000,000 Volts) have been demonstrated to remove up to 90% of the NO$_x$ emissions from a coal fired power plant. See "Accelerators for Americas Future," Symposium Proceedings, Walter Henning and Charles Shank Chairs. Published by US Department of Energy, June 2010.

The process for removing NO$_x$ from exhaust gas with electron beams, also called "flue gas," has been established using a catalytic process in which ammonia and water are injected into the flue gas before the gas is irradiated by a continuous electron beam. The electron beam dissociates the water molecules into free radicals, which then reacts with the NO$_x$ to produce nitric acid. The acid is neutralized by the ammonia to produce ammonium nitrate [NH$_4$NO$_3$], which can be used as a fertilizer. See R. Kikuchi and Y. Pelovski, "Low-dose irradiation by electron beam for the treatment of high-SO$_x$ flue gas on a semi-pilot scale—Consideration of by-product quality and approach to clean technology," Process Safety and Environment 87 (2009) 135-143; see also U.S. Pat. No. 5,695,616 to Helfrich et al.

This catalytic process has been demonstrated in pilot coal plants in the US, Japan, Germany, Poland, China, and Russia, see S. Korenev and R. Johnson, "Electron accelerators for cleaning flue gases and for oil liquefaction," Proceedings of EPAC08, Genoa, Italy 2008. Paper TUPP141; as well as on oil based plants, see A. A. Basfar, O. I. Fageeha, N. Kunnummal, A. G. Chmielewski, J. Licki, A. Pawelec, Z. Zimek, and J. Warych, "A review on electron beam flue gas treatment (EBFGT) as a multicomponent air pollution control technology," NUKLEONIKA 2010; 55(3):271-277.

The inventors of the present invention previously developed an apparatus and method for catalyst-free removal of NO$_x$ from exhaust gases from combustion fuel sources using pulsed electron beams. See U.S. Pat. No. 9,089,815 entitled "Catalyst-Free Removal Of NO$_x$ From Combustion Exhausts Using Intense Pulsed Electron Beams," the entirety of which is hereby incorporated by reference into the present disclosure. One limitation of this previously developed technique is that the NO$_x$ is removed a temperatures higher than room temperature. In addition, the prior technique used temporally longer electron beam pulses, which the inventors have found not only require more energy to produce but are not as efficient in the NO$_x$ removal process as are shorter pulses. Finally, the previously developed technique required the creation of a magnetic field to direct the electron beam into the gas, which creates complications in fielding of the application due to dimensions and power consumption of the magnet.

The present invention provides an improved technique and apparatus which overcomes these drawbacks of the inventors' previously developed technique.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides an improved process and for removing NO$_x$ from exhaust gases produced by combustion-based energy sources such as coal-fired power plants, oil-fired power plants, gas turbines, diesel internal combustion engines, and gasoline-based internal combustion engines.

In accordance with the present invention, exhaust gas that is free from ammonia or any other catalyst is directed into one or more ducts, where the dimensions of the ducts correspond to the maximum in utilization of electron beam energy corresponding to the voltage.

For example, in the case of a 500 keV electron beam with a 1 meter×0.3 meter cathode area, one exemplary duct configuration that can be used includes a roughly square 1 meter×1 meter duct, with the flue gas flow perpendicular to the long axis of the cathode, while another exemplary configuration includes a narrow 0.3 meter×1 meter rectangular duct, with the flue gas flow parallel along to the long axis of the cathode. In either configuration, the electrons from a 500 keV cathode can uniformly deposit their energy at a range of about 1 meter, which limits the size of the duct that can be used. If the voltage of the cathode is increased to 750 keV or 1 MeV, this range increases to about 2 meters and about 3 meters, respectively, so that at higher voltages, enabling the use of larger rectangular ducts that can accommodate a greater volume of flue gas.

As the gas enters a duct, it is cooled, e.g., by a series of water pipes surrounding the duct, with any condensate from the cooled gas being removed from the gas flow through a drain in the duct. The cooled gas then travels through the duct into a reaction chamber having one or more "windows" through which a single short, intense electron beam pulse is fired through a thin foil into the gas as it travels past the window, the pulse being fired without any external magnetic field being applied to direct the beam. The gas flow rate and the electron beam pulse rate are configured to cause each successive volume of gas that flows past the window to be subjected to only a single electron beam pulse.

As they travel through the gas, the electrons from the electron beam pulse deposit their energy into the gas. In addition, some of the electrons are reflected back into the gas by a reflective plate situated opposite the window to further increase the energy deposition. This energy causes the $NO_x$ in the gas to dissociate into reactive radicals $N_2^+$, $N^+$, e, and $N_2$ which recombine through chemical reactions to produce benign by-products nitrogen $N_2$ and oxygen $O_2$ which are output into the atmosphere.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides an improved method and apparatus removing $NO_x$ and other contaminants from exhaust gases, also sometimes called "flue gases" herein, produced by combustion-based energy sources such as coal-fired power plants, oil-fired power plants, gas turbines, diesel internal combustion engines, and gasoline-based internal combustion engines.

Figure 1:
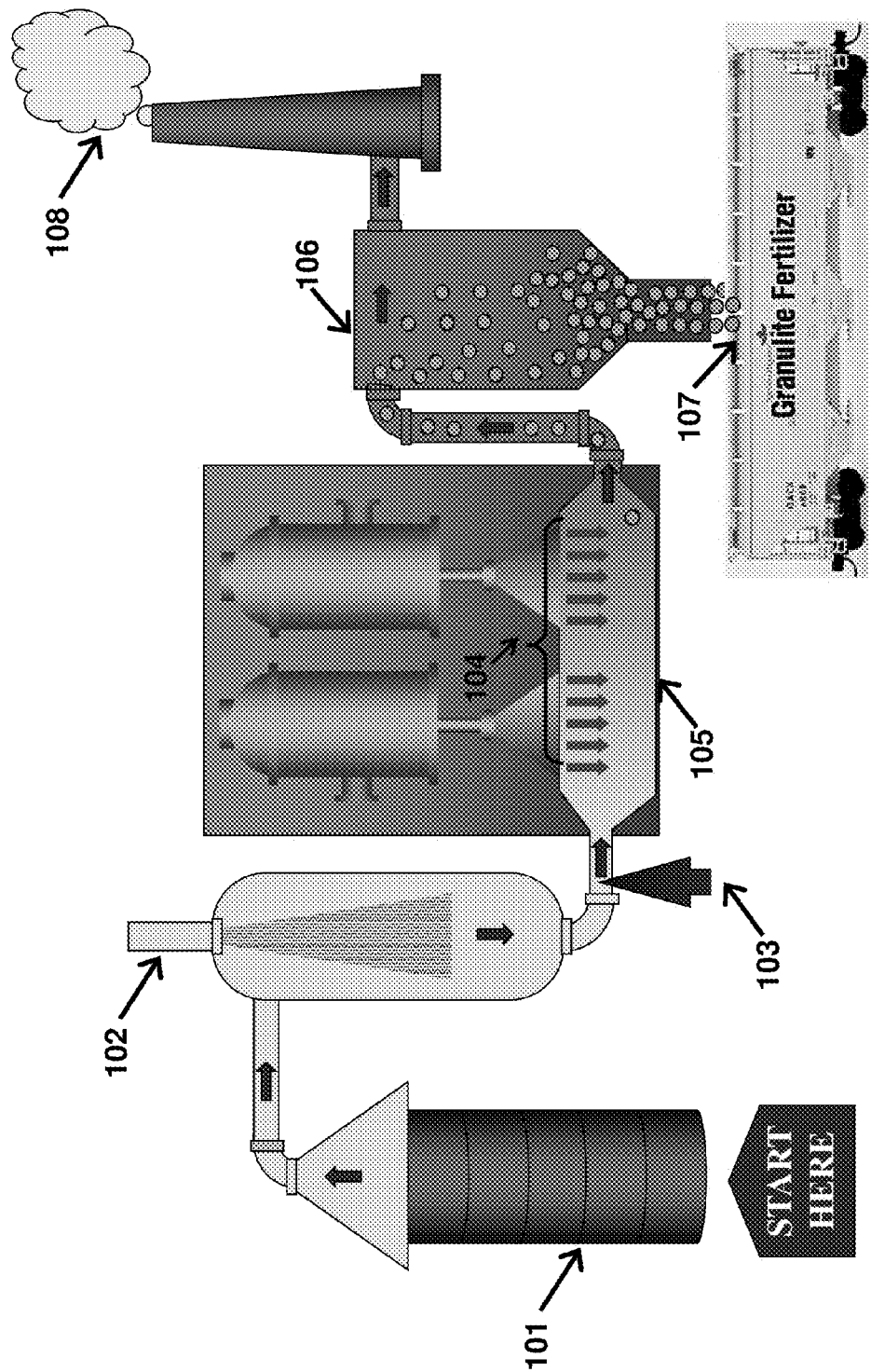
FIG. 1 is a block diagram illustrating aspects of a typical apparatus for removal of $NO_x$ from combustion exhaust using a continuous electron beam and an ammonia catalyst in accordance with the prior art.

Conventional processes for using electron beams to remove $NO_x$ from combustion exhausts required the use of continuous electron beams and the addition of ammonia as a catalyst in the process. FIG. 1 illustrates an exemplary apparatus used in such a conventional process in accordance with the prior art. As shown in FIG. 1, in the conventional system, combustion exhaust from exhaust flue 101 travel past water source 102, which adds water to the exhaust, and ammonia source 103, which adds ammonia to the exhaust, and into reaction chamber 105. Once in the reaction chamber, the combined exhaust, water, and ammonia, are irradiated with electron beams 104. As a result of the electron beam irradiation, the water molecules are dissociated into free radicals, i.e., molecules with unpaired electrons that are highly reactive chemically. The free radicals then react with the $NO_x$ in a reaction chamber 106 to produce nitric acid $HNO_3$, which is neutralized by the ammonia $NH_3$ to produce ammonium nitrate $NH_4NO_3$. The ammonium nitrate is output as a by-product 107 which can be used as a fertilizer, with the scrubbed exhaust gas 108 being output into the atmosphere.

As noted above, the inventors of the present invention previously made significant improvements to this prior art process for removing $NO_x$ from flue gases. These improvements, described in U.S. Pat. No. 9,089,815, supra, provided an apparatus and a process for removing $NO_x$ from exhaust gases using pulsed electron beams without the need for addition of a catalyst or removal of catalyst-produced by-products. In this prior method by the inventors, the pulse is directed into the gas by the use of a magnetic field produced by a magnetic inductor output switch forming part of the high voltage pulsed power electron beam generator.

Figure 2:
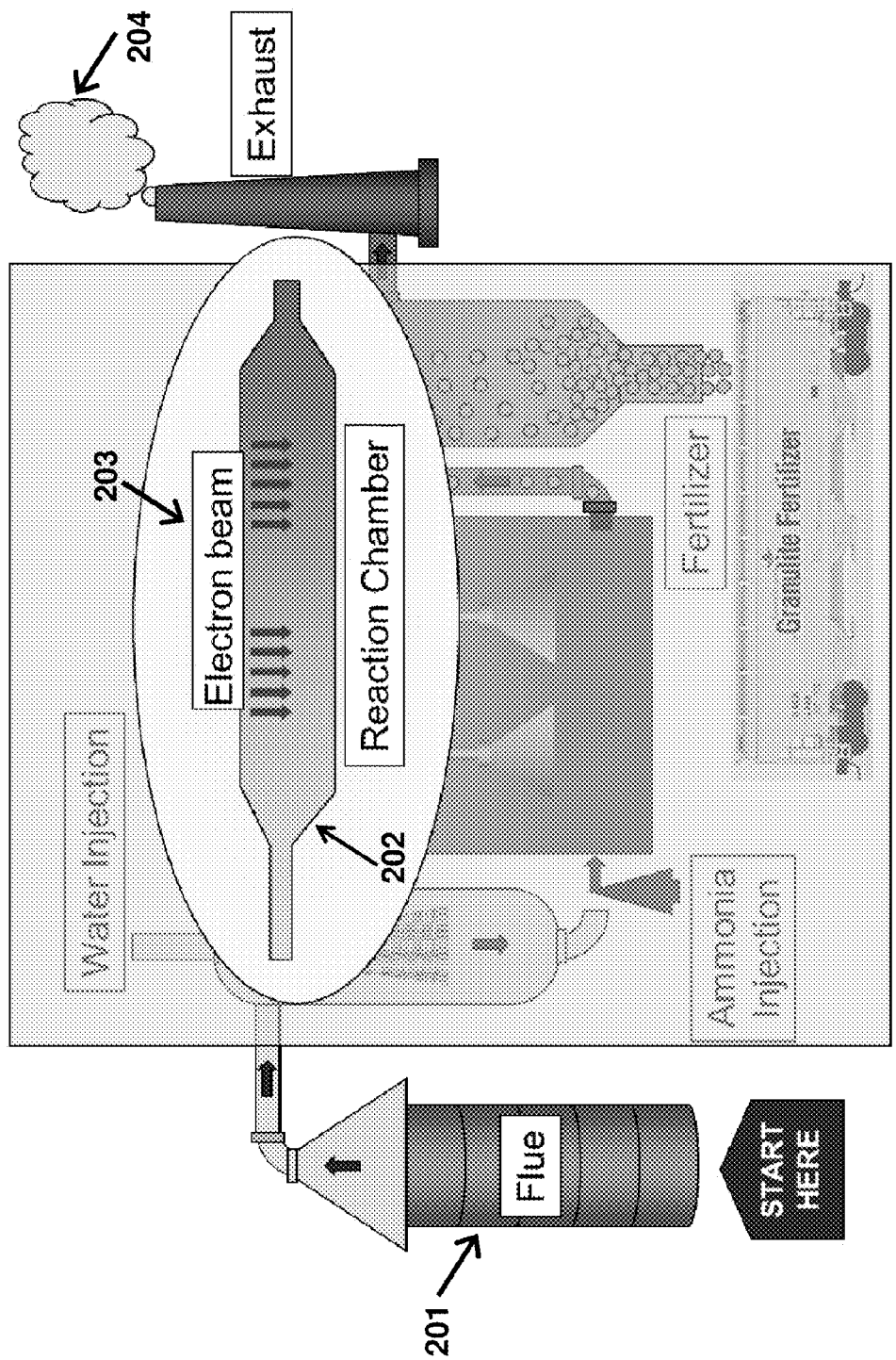
FIG. 2 is a block diagram illustrating aspects of an exemplary apparatus and process for catalyst-free removal of $NO_x$ from combustion exhaust using a single short, intense electron beam pulse in accordance with the present invention.

The process of the '815 patent, aspects of which are illustrated in FIG. 2, replaces the injected water 102, ammonia 103, and by-products 108 of the conventional process with an apparatus in which combustion exhaust from flue 201 travels directly into a reaction chamber 202 where it is illuminated by pulsed electron beams 203 and then is directly output from the system, the $NO_x$ from the input exhaust having been converted into harmless $O_2$ and $N_2$ released into the atmosphere as part of exhaust 204.

The present invention provides further improvements to the $NO_x$ removal process and apparatus described in the '815 patent.

As described in more detail below, in accordance with the present invention, exhaust gas that is free from ammonia or any other catalyst is directed into one or more ducts, where the dimensions of the ducts correspond to the maximum in utilization of electron beam energy corresponding to the voltage. It will be noted that the voltages and duct configurations described below are merely exemplary, and one skilled in the art will understand that other suitable voltages and duct configurations can be used where appropriate.

For example, in the case of a 500 keV electron beam with a 1 meter×0.3 meter cathode area, one exemplary duct configuration that can be used includes a roughly square 1 meter×1 meter duct, with the flue gas flow perpendicular to the long axis of the cathode, while another exemplary configuration includes a narrow 0.3 meter×1 meter rectangular duct, with the flue gas flow parallel along to the long axis of the cathode. In either configuration, the electrons from a 500 keV cathode can uniformly deposit their energy at a range of about 1 meter, which limits the size of the duct that can be used. If the voltage of the cathode is increased to 750 keV or 1 MeV, this range increases to about 2 meters and about 3 meters, respectively, so that at higher voltages, enabling the use of larger rectangular ducts that can accommodate a greater volume of flue gas.

Removing the $NO_x$ from the flue gas in ducts allows greater flexibility for positioning in the flue gas stream relative to other treatments of the gas. As the flue gas enters a duct, it is cooled, e.g., with water piping wrapped around the duct, and possibly within duct, to room temperature. The process of cooling the flue gas to room temperature will produce condensates (including some water) which are removed from the system by means of a drain provided in the duct. The cooled gas then travels through the duct into a reaction chamber having one or more "windows" formed therein. As the gas passes a window, a single short, intense electron beam pulse is fired through a thin foil into the gas, where the pulse is directed into the gas without the use of any magnetic field to guide it as in the inventors' prior method. The gas flow rate and the electron beam pulse rate are configured to cause each successive volume of gas that flows past the window to be subjected to only a single electron beam pulse. The flow of the gas through the duct can be controlled by any appropriate means, such as through appropriate duct design or by means of a pump that receives the raw flue gas and controllably directs the gas into the duct.

Each pulse deposits the energy of its electrons into the gas. In addition, in accordance with the present invention, a reflective plate is situated in the duct opposite the windows; this plate reflects a portion of the electrons from the pulse back into the gas to further increase the energy deposited into the gas. The deposited energy converts the $NO_x$, within the flue gas to benign components mostly made up of oxygen ($O_2$) and nitrogen ($N_2$) that are released into the atmosphere. The exhaust gas finally expelled from the reaction chamber will thus have a significant fraction of the $NO_x$ and other contaminants removed. In addition, because the flue gas is free from the ammonia or other catalyst required in many prior art methods, there are no by-products that must be dealt with as in the methods of the prior art.

Figure 3:
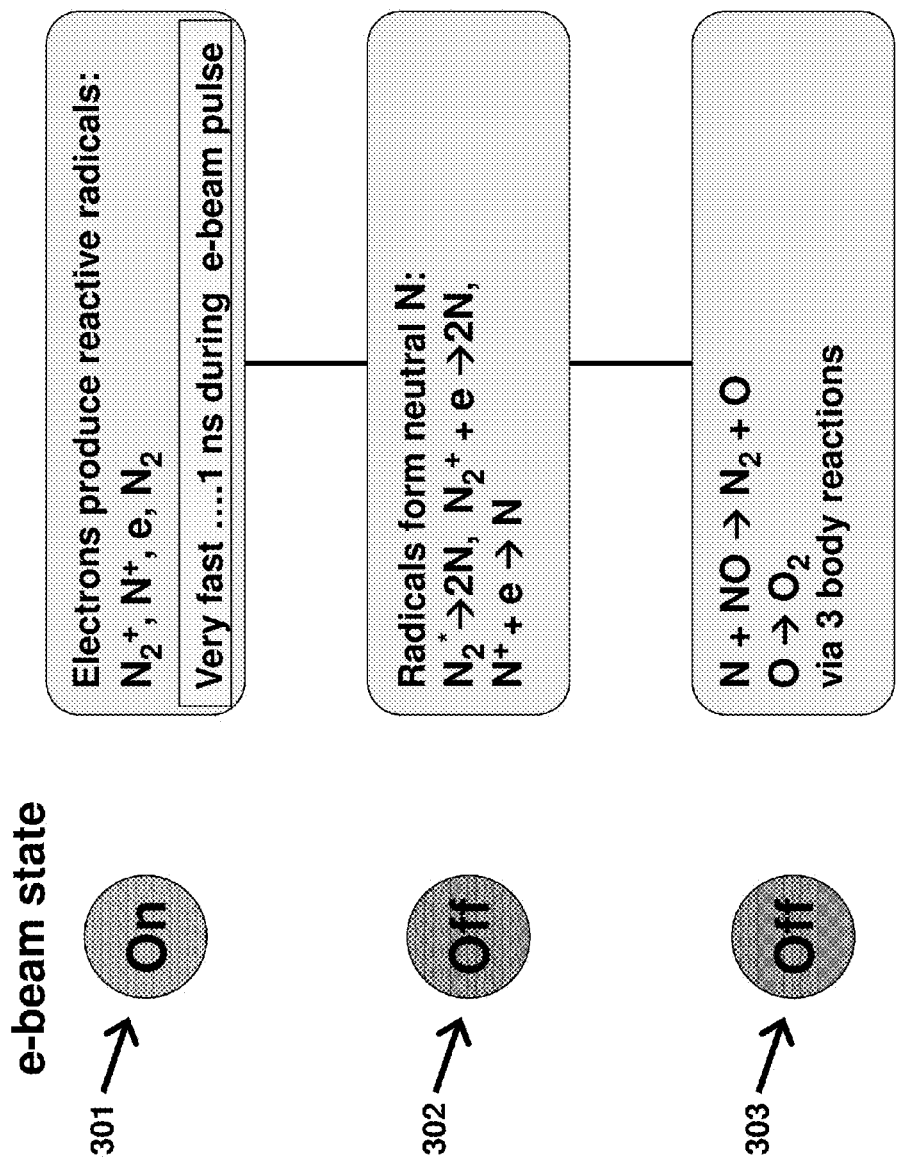
FIG. 3 is a block flow diagram illustrating aspects of a process for catalyst-free removal of $NO_x$ from combustion exhaust using a single short, intense electron beam pulse in accordance with the present invention.

The flow chart in FIG. 3 illustrates aspects of a process for removing $NO_x$ from exhaust gases in accordance with the present invention. As illustrated in FIG. 3 and as described in more detail below, the process in accordance with the present invention utilizes a single short, intense electron beam pulse, which is turned "on" to illuminate the combustion gas as it passes in front of a "window" in the reaction chamber and is then turned to the "off" state. The benefit of pulsed electron beam system is that the electron beam is turned turns "off" after the free radicals are formed so that it does not interfere with the subsequent reactions in the process. In addition, a single short, intense pulse excites a thermally cooler gas and therefore deposits its energy into the flue gas more efficiently than do multiple pulses, because it interacts with a relatively cool gas mixture instantaneously and does not allow a build-up of the thermal energy which reduces the effectiveness of the $NO_x$ removal process as can a series of multiple pulses. In addition, the ability to control the emissions in a single pulse allows higher gas flow rate through the ducts because the gas does not have to be slowed to account for the inter-pulse time of the multiple pulse approach.

Thus, as described above, the flue gas flows through a duct having one or more windows formed therein and having a reflective material opposite the windows. The gas is cooled and then is moved through the duct so that a predetermined volume of the gas passes between the windows and the reflective material at a given time.

As illustrated in FIG. 3, at step 301, at a predetermined time when the predetermined volume of gas is in front of a window in the duct, the electron beam is turned "on" so that a single intense electron beam pulse, typically having a pulse length of less than 70 ns, is fired through the flue gas in the reaction chamber. When the pulse is fired, electrons from the electron beam travel into the reaction chamber and transfer their energy into the gas, with some of the electrons being reflected back into the gas by the reflective material to further increase the energy deposited. The deposited energy causes the formation of reactive radicals $N_2^+$, $N^+$, e, and $N_2$ from the $NO_x$ in the gas. The formation of these reactive radicals occurs very quickly, usually within about 1 ns, accumulating to their greatest concentration at the end of the electron beam pulse.

At step 302 shown in FIG. 3, the pulsed beam is turned off and the radicals combine to form neutral nitrogen N through the reactions $N_2^* \rightarrow 2N$, $N_2^+ + e \rightarrow 2N$, and $N^+ + e \rightarrow N$. Finally, at step 303, with the beam remaining off, the nitrogen N and nitric oxide NO from the $NO_x$ combine to form nitrogen $N_2$ and oxygen $O_2$ in a three-body reaction in which $N + NO \rightarrow N_2 + O$ and $O \rightarrow O_2$, wherein the reactions proceed without any catalyst being added to the exhaust or any external magnetic field being applied The nitrogen $N_2$ and oxygen $O_2$ are then output into the atmosphere as harmless components of the scrubbed exhaust.

The parameters of the electron beam pulse can be varied as appropriate. For example, the voltage of high voltage power source 405 typically will be about 500,000 to about 1,000,000 Volts (500 keV to 1 MeV), and can be adjusted to that the electrons deposit the highest percentage of their energy with a reasonable uniformity, depositing equivalent electron energy, i.e., about 500 keV to about 1 MeV, within the flue gas. The current used typically will be about 100,000 to about 500,000 Amperes, but can be adjusted as needed so that the electrons deposit enough energy to remove the required $NO_x$ in one shot of electrons. The pulse length is very short, typically less than about 70 ns to optimize energy efficiency in the $NO_x$ removal process. The pulse repetition rate typically will be about 1 to about 10 pulses per second, but can be adjusted as appropriate to expose all of the flue gas through the duct. The pulse repetition rate will be dependent on the length of array of electron diodes as well.

FIGS. 4, 5A and 5B, and 6A-6C further illustrate aspects of the method for removing $NO_x$ and other contaminants from combustion exhaust in accordance with the present invention and illustrate aspects of exemplary apparatus configurations that can be used in such a method. It will be noted that in all of the FIGURES and in the description herein, where a structural element appears in more than one FIGURE, those elements are denoted by the same reference numeral, with only the first digit being changed to reflect the FIGURE in which they are shown. For example, reaction chamber 202 shown in FIG. 2 described above corresponds to reaction chamber 402 shown in FIG. 4 and reaction chamber 502 shown in FIGS. 5A and 5B.

Figure 4:
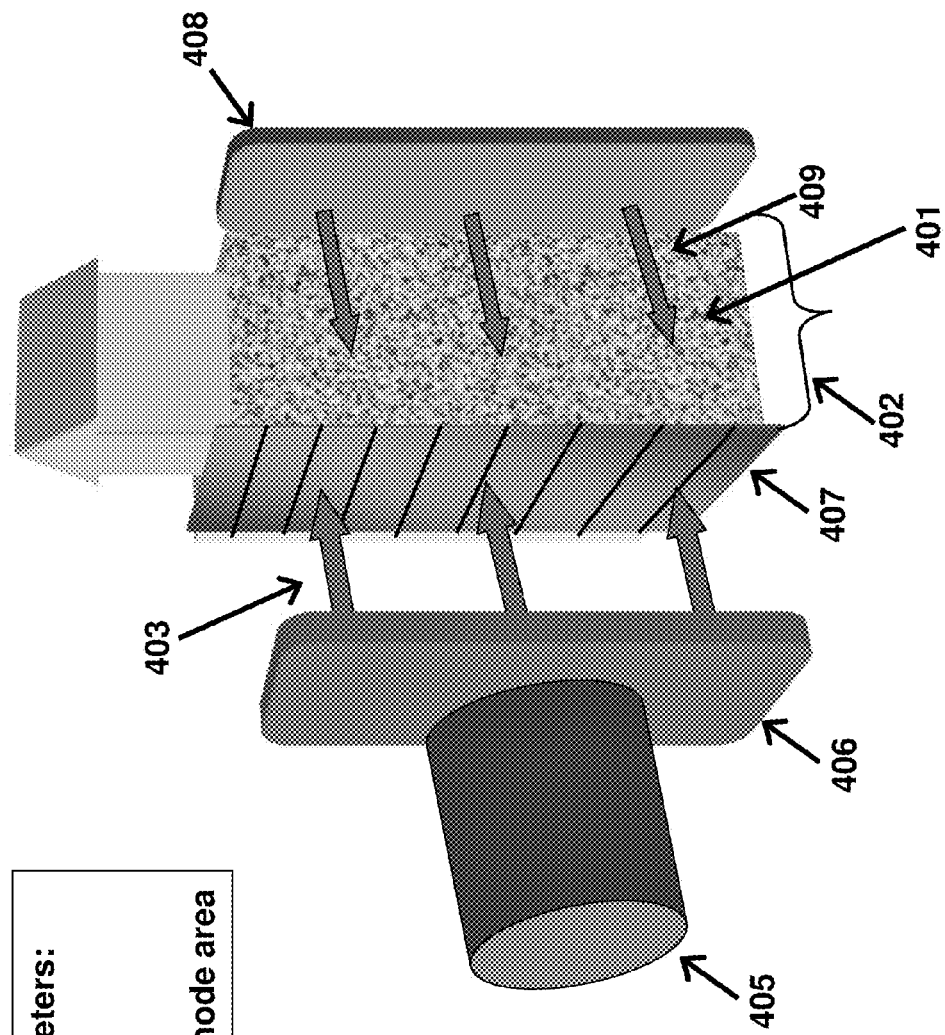
FIG. 4 is a block diagram further illustrating aspects of an exemplary configuration of an apparatus for catalyst-free removal of $NO_x$ from combustion exhaust using a single short, intense electron beam pulse in accordance with the present invention.

Thus, FIG. 4 illustrates an exemplary configuration of an electron beam apparatus for use in a method for removing $NO_x$ and other contaminants from combustion exhaust in accordance with the present invention.

As illustrated in FIG. 4, the apparatus includes a high voltage pulsed power source 405 configured to drive an array of high voltage electron beam pulses 403 through a thin foil into flue gas 401 as it travels through reaction chamber 402, where each pulse in the array is fired into the gas a single time. In an exemplary embodiment, the high voltage to drive electron beam pulses 403 is created by an all solid-state system that includes a Marx Generator made from solid-state thyristors and thin film capacitors, and one or more pulse forming lines, though any other appropriate power source can also be used. Electron beam pulse 403 is generated by applying this high voltage to a large area emitter (cathode) 406 which produces the electron beam by field emission and/or plasma formation. Any appropriate cathode can be used, though it is typically not a thermionic cathode that requires high temperatures or control grids, with typical cathode dimensions ranging from about 30 cm by 100 cm to 60 cm×200 cm. In an exemplary embodiment, the cathode is made of an array of straight carbon or polymer fibers, 2-6 mm in length, that have been bonded to a conducting base.

Initial electron beam pulse 403 is accelerated through a thin metal foil 407 into the flue gas 401 which flows through reaction chamber 402. Foil 407 can be made of stainless steel, titanium, or a titanium alloy, and may have a thin coating to prevent chemical interaction with the flue gas 401. The foil can be held in place by any appropriate means, such as by an array of support ribs as is shown in the FIGURE. To maximize efficiency, electron beam pulse 403 may be emitted in strips that propagate between the ribs. As described in more detail below, electron beam pulse 403 enters the flue gas 401 through a "window" formed in a side of reaction chamber 402. The flow of the flue gas is controlled so that the gas travels at a predetermined rate past the window, wherein the flow rate and the electron beam pulse rate are configured to cause each successive volume of gas that flows past the window to be subjected to only a single electron beam pulse.

In addition, as noted above, in accordance with the present invention, reaction chamber 402 further includes a reflective plate 408 situated on an inner surface of the reaction chamber opposite the window, wherein reflective plate 408 reflects some of the electrons from initial electron beam pulse 403 to form reflected electrons 409 which travel back into the flue gas and deposit additional energy into the gas.

Figure 5A:
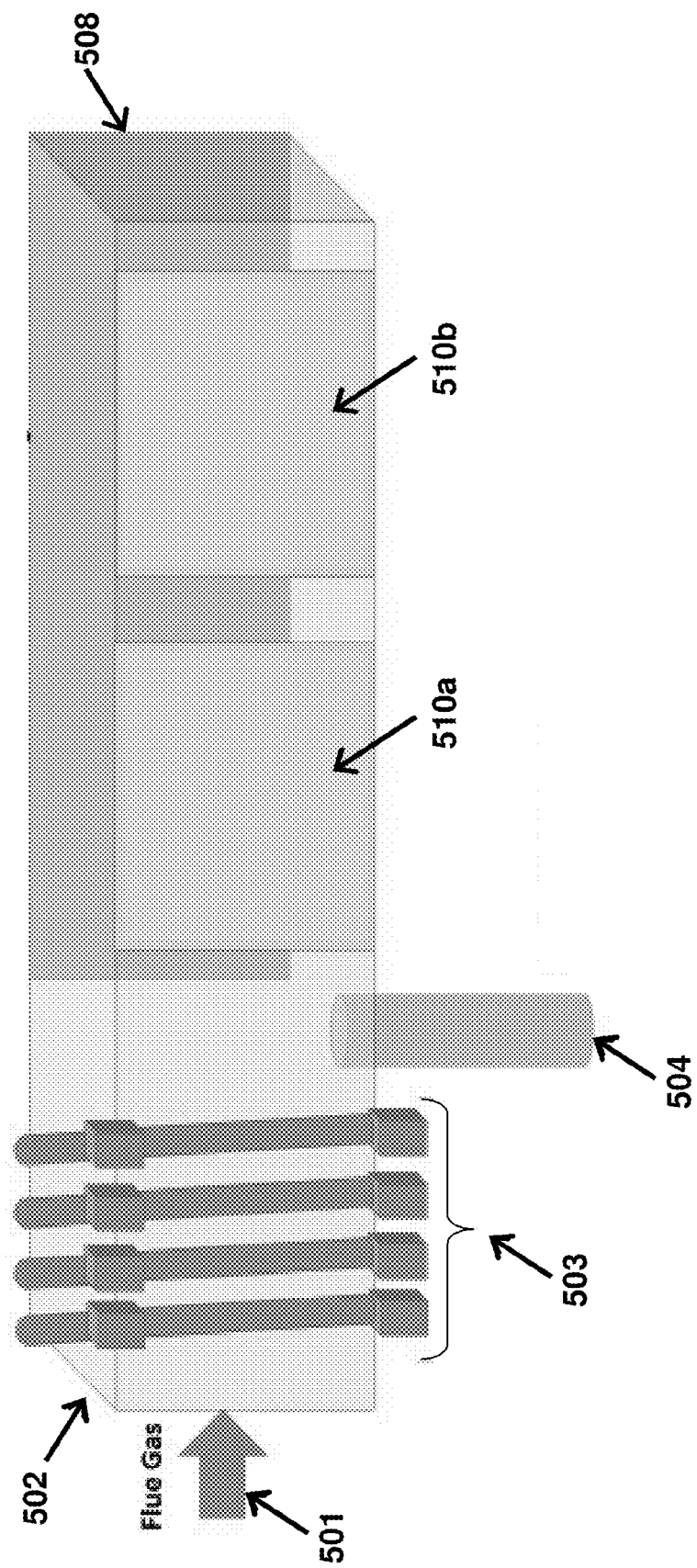
FIGS. 5A and 5B are block diagrams illustrating aspects of an exemplary apparatus for catalyst-free removal of $NO_x$ from combustion exhaust using a single short, intense electron beam pulse in accordance with the present invention.
Figure 5B:
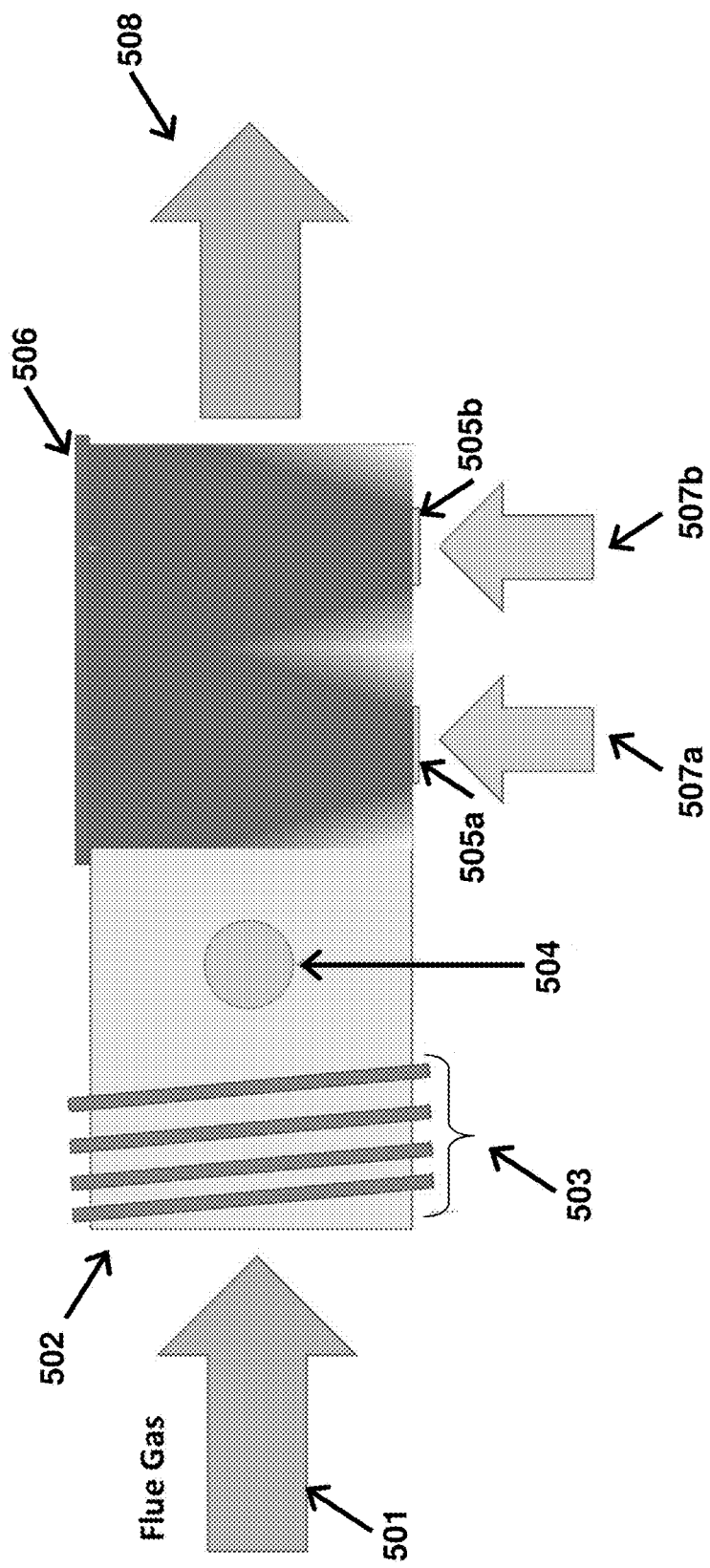

FIGS. 5A and 5B are block diagrams depicting a side view (FIG. 5A) and top view (FIG. 5B) further illustrating aspects of a reaction chamber that can be used in a method for using electron beams to remove $NO_x$ from combustion exhaust in accordance with the present invention.

As described above, in the method of the present invention, the flue gas is directed into one or more ducts for treatment by the electron beam illumination process of the present invention, wherein the reaction chamber where the treatment occurs forms part of the duct. Thus, as illustrated in FIGS. 5A and 5B, reaction chamber 502 can be in the form of a narrow duct whose dimensions of the duct correspond to the voltage of the electron beam system. Thus, for an exemplary 500 keV electron beam system, reaction chamber 502 can be in the form of a narrow duct having a rectangular flue gas cross section of 1 meter×1 meter, while as described above, for electron beam voltages of 750 keV and 1 MeV, the duct dimensions would increase to 1 meter×2 meter and 1 meter×3 meter, respectively.

In accordance with the method of the present invention, the flue gas is cooled to room temperature in the duct before it enters the reaction chamber. In the exemplary embodiment shown in FIGS. 5A and 5B, cooling of the gas is achieved by the use of water pipes 503 that wrap around the duct, though any other suitable cooling means such as passing the gas through a refrigerator, adding nonreactive coolant to flue gas mixture, or passing the gas through a heat exchanger throughout the volume of the duct can be used as appropriate. As the hot combustion gas cools, condensates, including water, that may be produced, are removed via drain 511 before the cooled gas travels further into the reaction chamber for treatment.

As described above, the reaction chamber has one or more "windows" 510a/510b, through each of which a single short, intense electron beam pulse is fired from a corresponding electron beam source into the gas as it travels past the window, where the electron beam pulse is directed into the gas without the use of an external magnetic field as in other prior art methods. The gas flow rate and the electron beam pulse rate are configured to cause each successive volume of gas that flows past the window to be subjected to only a single electron beam pulse.

In addition, as described above, in the apparatus in accordance with the present invention, each duct further includes a reflective plate 508 situated opposite the windows 510a/510b. The reflective plate reflects a portion of the electrons from the initial electron beam pulse back into the flue gas, further increasing the energy deposited by the single electron beam pulse into the gas. As described above, this energy causes the harmful $NO_x$ in the flue gas to convert into nitrogen $N_2$ and oxygen $O_2$ which can be harmlessly emitted into the atmosphere as part of the final scrubbed exhaust 508 output from the reaction chamber.

Figure 6A:
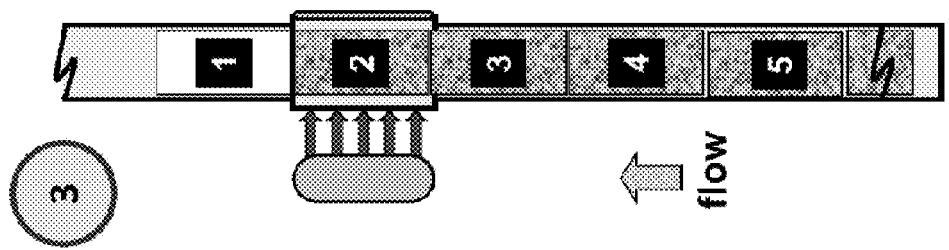
FIGS. 6A-6C are block diagrams further illustrating aspects of a method for catalyst-free removal of $NO_x$ from combustion exhaust using a single short, intense electron beam pulse in accordance with the present invention.
Figure 6B:
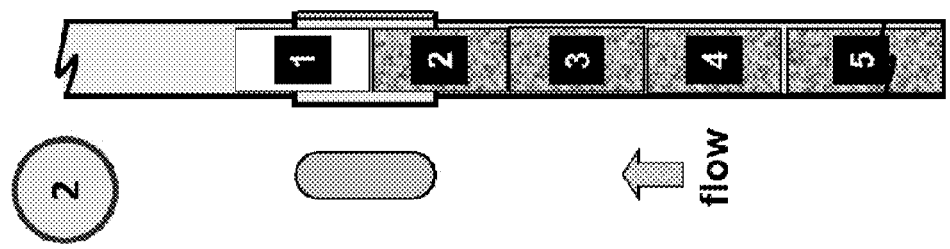
Figure 6C:
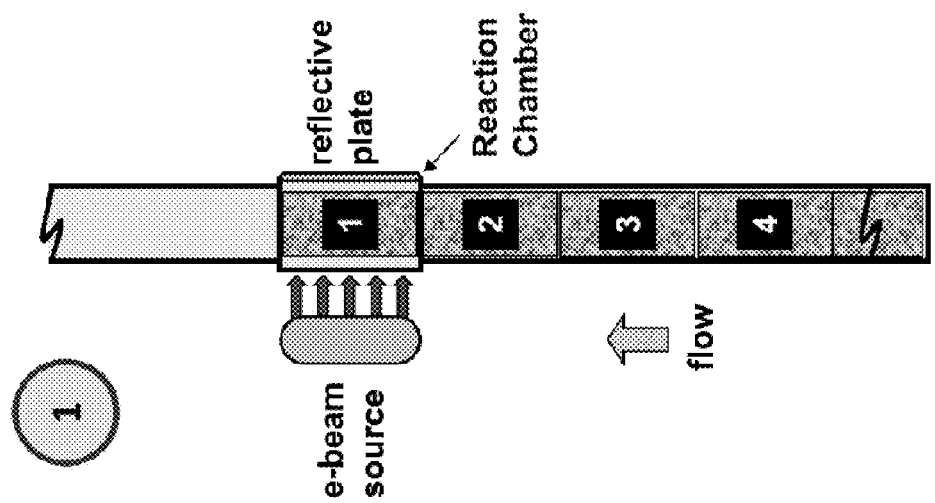

FIGS. 6A-6C further illustrates the way in which the cooled flue gas flow rate and the electron beam pulse rate are configured to cause each successive volume of gas that flows past the window to be subjected to only a single short intense electron beam pulse to remove $NO_x$ from the gas before it is output from the reaction chamber.

Thus, as shown in FIG. 6A, as the gas flows continuously through the reaction chamber, each electron beam pulse exposes a new volume as the gas proceeds through the duct system. The first electron beam pulse interacts with the first volume of gas. As each successive electron beam shot occurs, a new volume of gas enters the reaction chamber, is cooled, and proceeds through the duct to be illuminated by the electron beam. This flow allows all of the gas to be treated, with each successive volume of gas being illuminated by a single electron beam pulse, with the flow rate being determined by the pulse repetition rate of the electron beam source and the volume of gas being interacted with in the reaction chamber for each successive shot.

Thus, when the gas prescribed for electron beam pulse 1 reaches the portion of the duct having a window formed therein through which the electron beam can travel as described above, the e-beam source is turned "on" to fire a single short, intense electron beam pulse having a voltage of about 500 keV to 1 MeV and a pulse length less than 70 ns into the gas, the electron beam depositing energy of about 0.01 J/cc to 0.02 J/cc (depending on the desired $NO_x$ removal goals) into the volume of gas in front of the window. In addition, as described above, in accordance with the present invention, some of the electrons from the electron pulse are reflected back into the gas by a reflective plate situated opposite the window to provide an additional injection of electron energy into the flue gas and further induce the formation of reactive radicals $N_2^+$, $N^+$, e, and $N_2$ from the $NO_x$ in the gas.

After the initial short, intense electron beam pulse, the electron beam is turned off, and the remaining reactions described above with respect to FIG. 3 occur in the gas volume illuminated by electron beam pulse 1, i.e., the radicals combine to form neutral nitrogen N through the reactions $N_2^* \rightarrow 2N$, $N_2^+ + e \rightarrow 2N$, and $N^+ + e \rightarrow N$ and then the nitrogen N and nitric oxide $NO_x$ from the $NO_x$ combine to form nitrogen $N_2$ and oxygen $O_2$ in a three-body reaction in which $N+NO \rightarrow N_2+O$ and $O \rightarrow O_2$, wherein the reactions proceed without any catalyst being added to the exhaust or any external magnetic field being applied. As these reactions are occurring, as shown in FIG. 6B, the gas flow proceeds through the duct past the window so that, as seen in FIG. 6C, the gas prescribed for electron beam pulse 2 reaches the window and is in turn illuminated by a single short, intense electron beam pulse to cause the conversion of $NO_x$ in that volume to $N_2$ and $O_2$ in the manner described herein.

To demonstrate the efficacy of the method of the present invention in removing NO from flue gas, the apparatus and method of the present invention was used to remove $NO_x$ from a surrogate flue gas that included 11.355% $CO_2$, 6.465% $O_2$, with the balance of the gas being nitrogen $N_2$ at 17.7 psi, the gas further including 99.5 ppm $NO_x$ and 55.5 ppm $SO_2$. The plots in FIGS. 7 to 12 illustrate the results of this testing and show that a single short, intense electron beam pulse is effective to remove $NO_x$ from exhaust gases that have been cooled to room temperature in accordance with the present invention.

Figure 7:
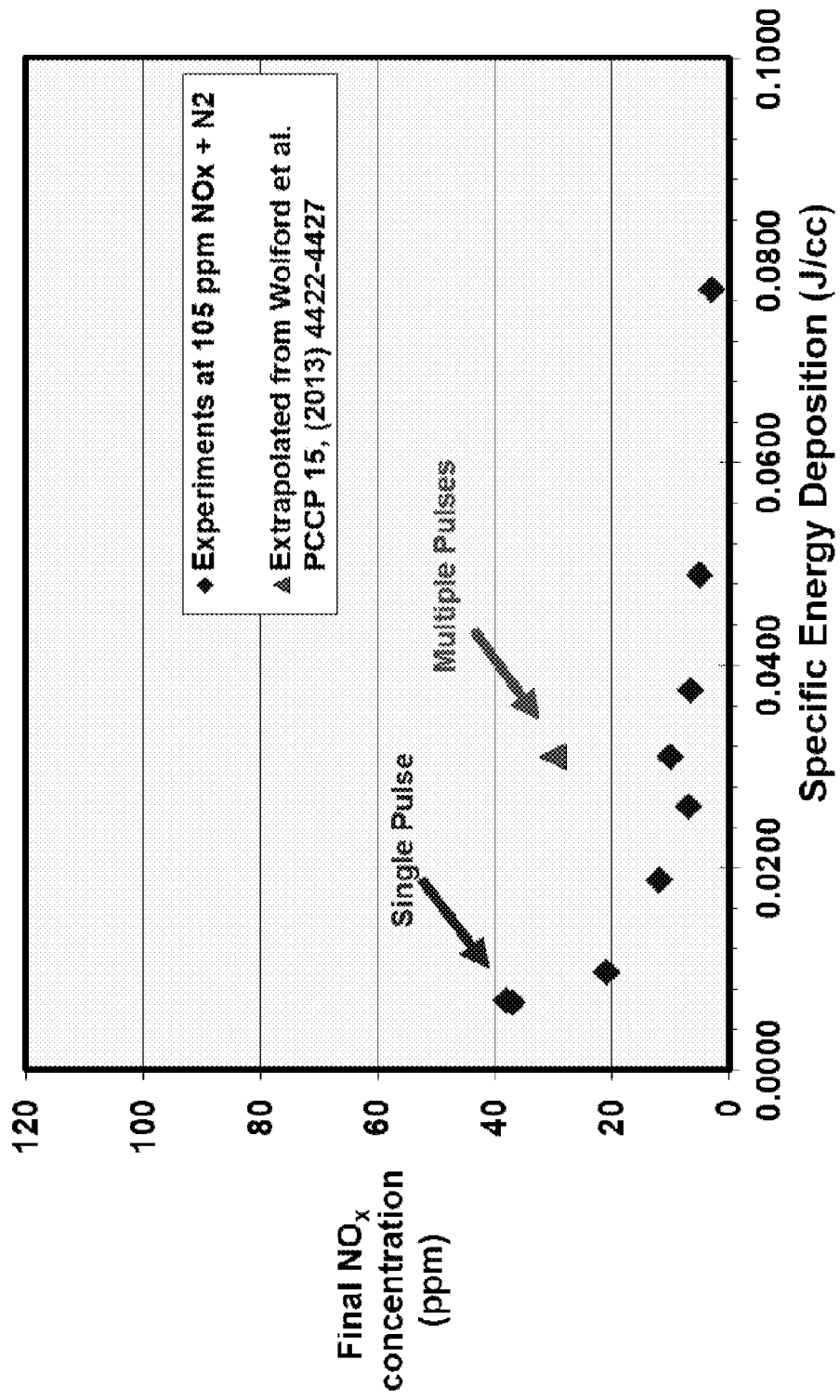
FIG. 7 is a plot illustrating aspects of removal of $NO_x$ from a surrogate combustion exhaust using a single short, intense electron beam pulse in accordance with the method of the present invention.

FIG. 7 demonstrates that a single pulse can be just as, is not more, effective at reducing the $NO_x$ concentration as are multiple pulses. For example, as shown in FIG. 7, a single pulse that deposits less than 0.0100 J/cc into a surrogate flue gas having an initial $NO_x$ concentration of 105 ppm can result in a final $NO_x$ concentration of less than 40 ppm, which is only slightly more than the final concentration of about 30 ppm obtained by multiple pulses with an energy deposition of 0.0300 J/cc. Even for single pulses depositing less energy than deposited by multiple pulses, the reduction in $NO_x$ obtained is comparable to or even greater than that obtained by multiple pulses. Indeed, FIG. 7 shows that a single pulse can be even more efficient in reducing the $NO_x$ concentration than are multiple pulses, with a single pulse that deposits 0.0300 J/cc into the exhaust gas resulting in a final $NO_x$ concentration of about 10 ppm, much lower than the 30 ppm obtained by multiple pulses depositing the same energy. Thus, using the method of the present invention, shorter pulse widths can arrive at 70-90% reduction in the NO concentration. The result exemplifies that less energy will be needed to arrive at the same result with this invention.

Figure 8:
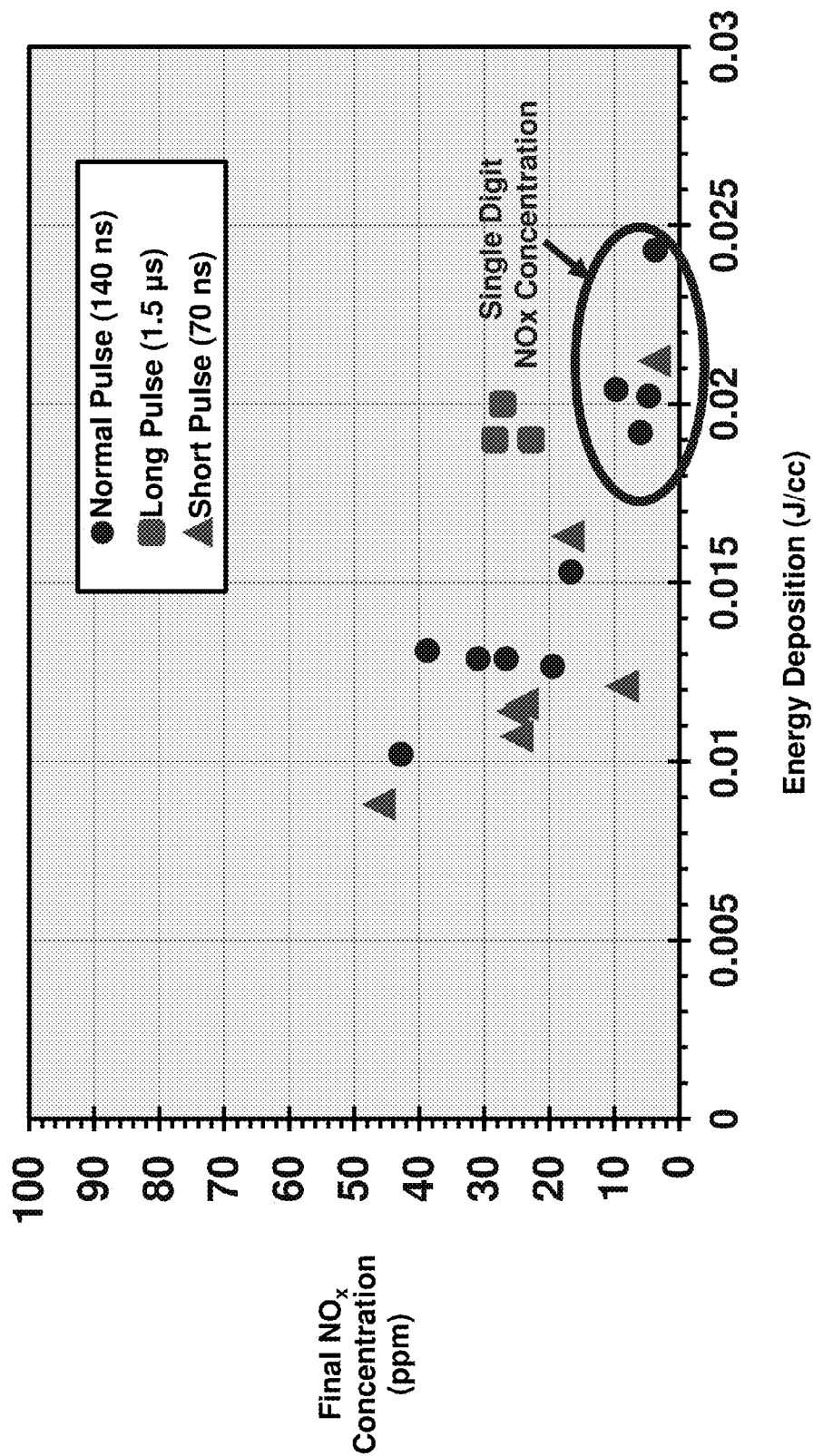
FIG. 8 is a plot further illustrating aspects of removal of $NO_x$ from a surrogate combustion exhaust using a single short, intense electron beam pulse in accordance with the method of the present invention.
Figure 9:
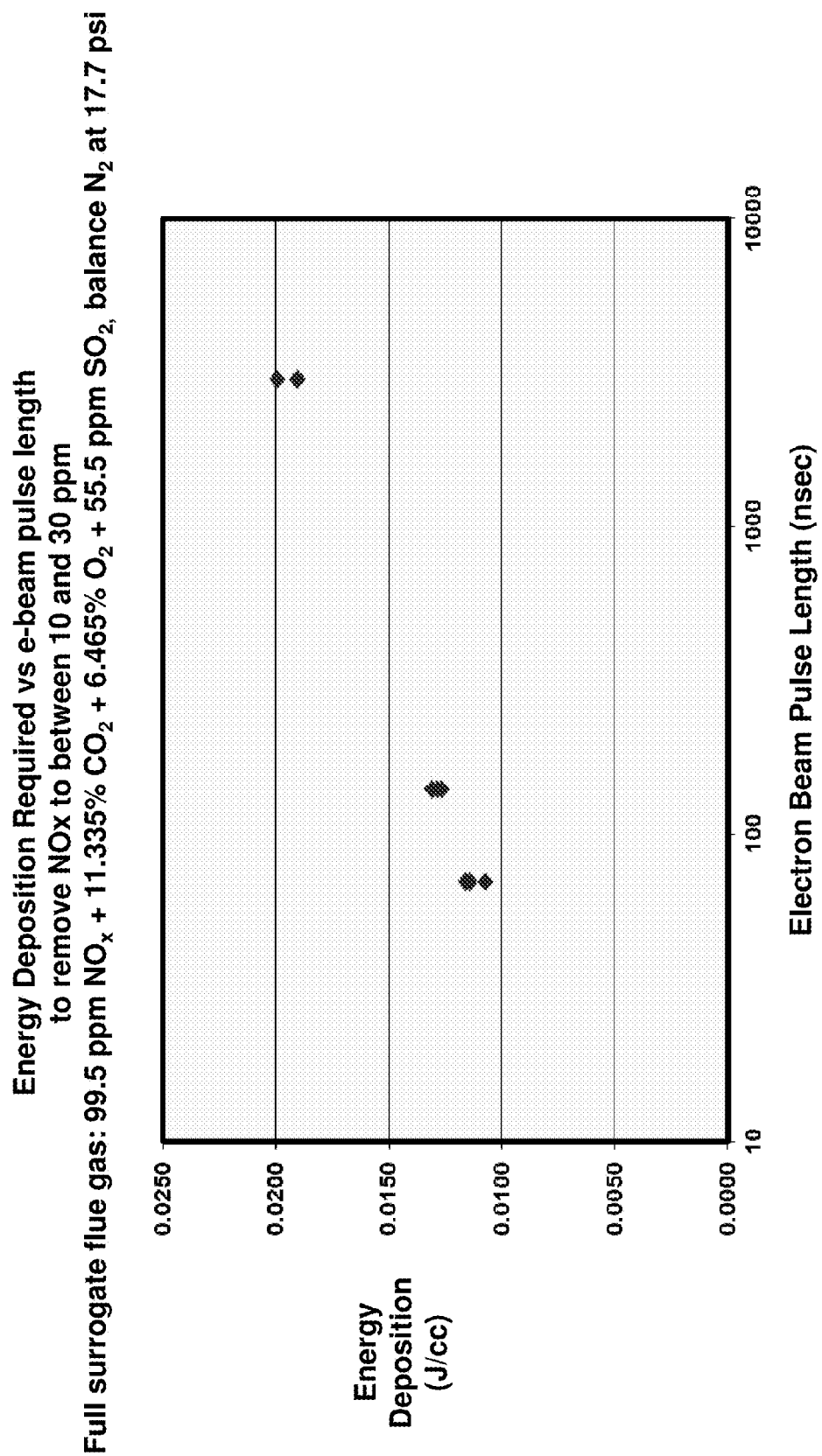
FIG. 9 is a plot further illustrating aspects of removal of $NO_x$ from a surrogate combustion exhaust using a single short, intense electron beam pulse in accordance with the method of the present invention.

The plots in FIGS. 8 and 9 further illustrate that the use of a single short, intense electron beam pulse in a method in accordance with the present invention can reduce NO concentration in a surrogate flue gas at least as well if not better than the use of multiple pulses as in the prior art.

FIG. 8 illustrates the $NO_x$ reduction obtained from the use of pulses having different pulse lengths and shows that short electron beam pulses, i.e., pulses having a pulse width on the order of 70 ns are just as effective as are longer pulses in reducing the concentration of $NO_x$ in a surrogate flue gas. Thus, as shown in FIG. 8, both a short electron beam pulse having a pulse width of about 70 ns and a longer pulse having a pulse width of about 140 ns were fired into a surrogate flue gas to provide an energy deposition of about 0.0125 J/cc into the gas; however, the shorter pulse resulted in a final $NO_x$ concentration of about 10 ppm, much lower than the 20 ppm and higher NO concentrations obtained by the use of the longer pulses. As shown in FIG. 8, a short pulse having sufficient intensity to provide an energy deposition of about 0.021 J/cc into the flue gas produced a final $NO_x$ concentration in the single digits, even better than was obtained by a longer pulse providing greater energy deposition. Thus, again, it was demonstrated that the method of the present invention provides significant reduction in $NO_x$ concentration using less energy than is needed in conventional methods.

This is even more clearly shown by the plot in FIG. 9. Where only the results of final $NO_x$ concentration between 10 and 30 ppm are plotted for the amount of deposition energy used as a function of electron beam pulse length. Presenting the data in this format makes it easier to visually depict the difference between 70 ns and 140 ns electron beam pulse width by removing the scatter from the sharp slope of $NO_x$ removal with increased energy deposition.

Figure 10:
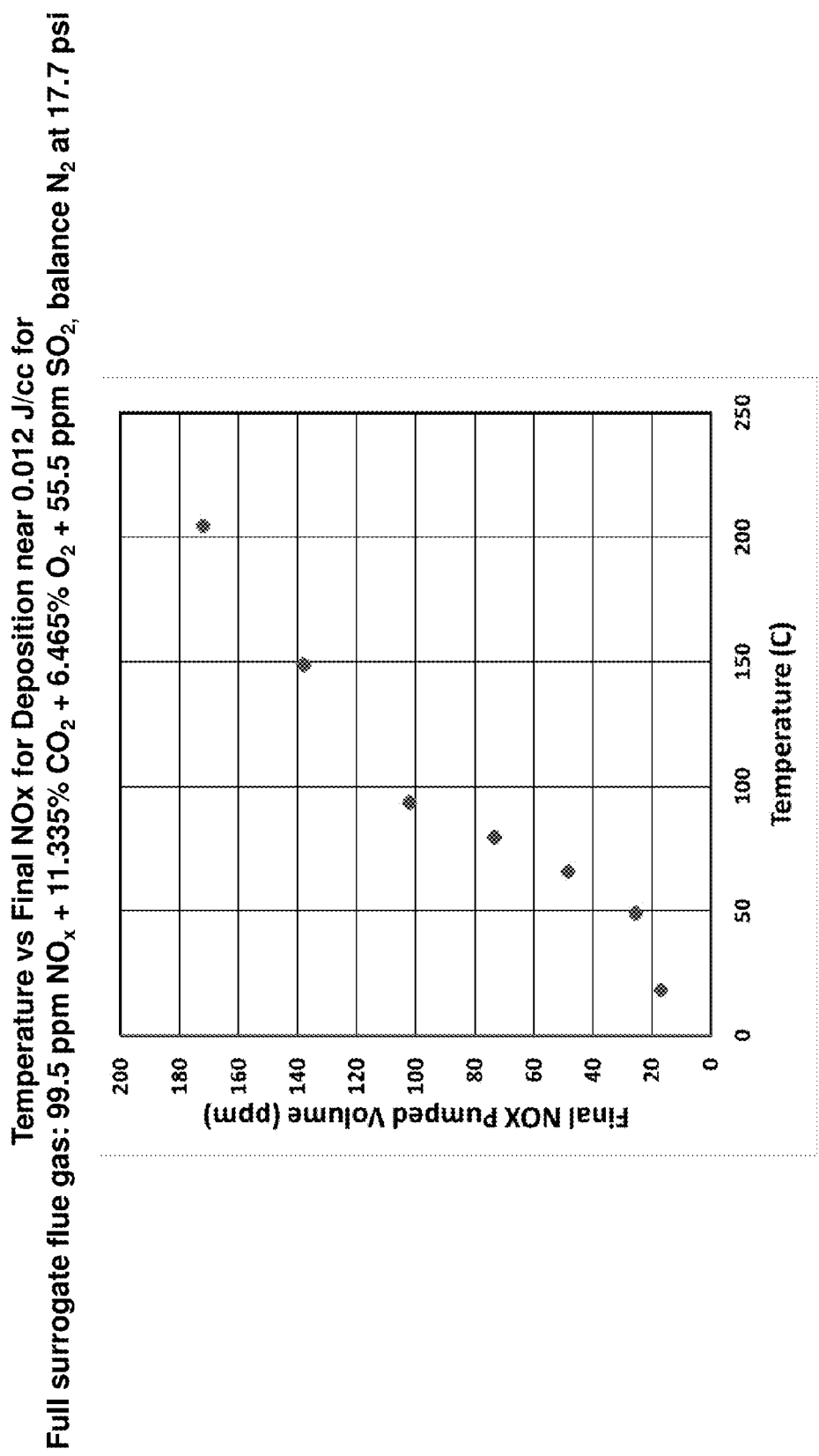
FIG. 10 is a plot illustrating aspects of removal of $NO_x$ from a cooled surrogate combustion exhaust using a single short, intense electron beam pulse in accordance with the method of the present invention.

One of the reasons that the use of a single pulse is so effective in the method of the present invention is that in accordance with the present invention, the flue gas is cooled to room temperature before is it illuminated by the electron beam pulse. FIG. 10 illustrate that as the temperature of the exhaust gas is reduced, so does the final volume of the $NO_x$ in the exhaust gas. The lower temperature of flue gas prior to electron beam interaction reduces the likelihood of $NO_x$ reforming and therefore being present downstream in the duct. Higher temperatures is a critical component in $NO_x$ formation in the combustion cycle. The electron beam allows the breaking of $NO_x$ bonds using N atoms without the high temperatures which thermodynamically favor $NO_x$ formation. Thus, cooling flue gas to room temperature before subjecting it to the electron beam pulse enables the $NO_x$ to be reduced using less energy than needed for conventional methods.

Figure 11:
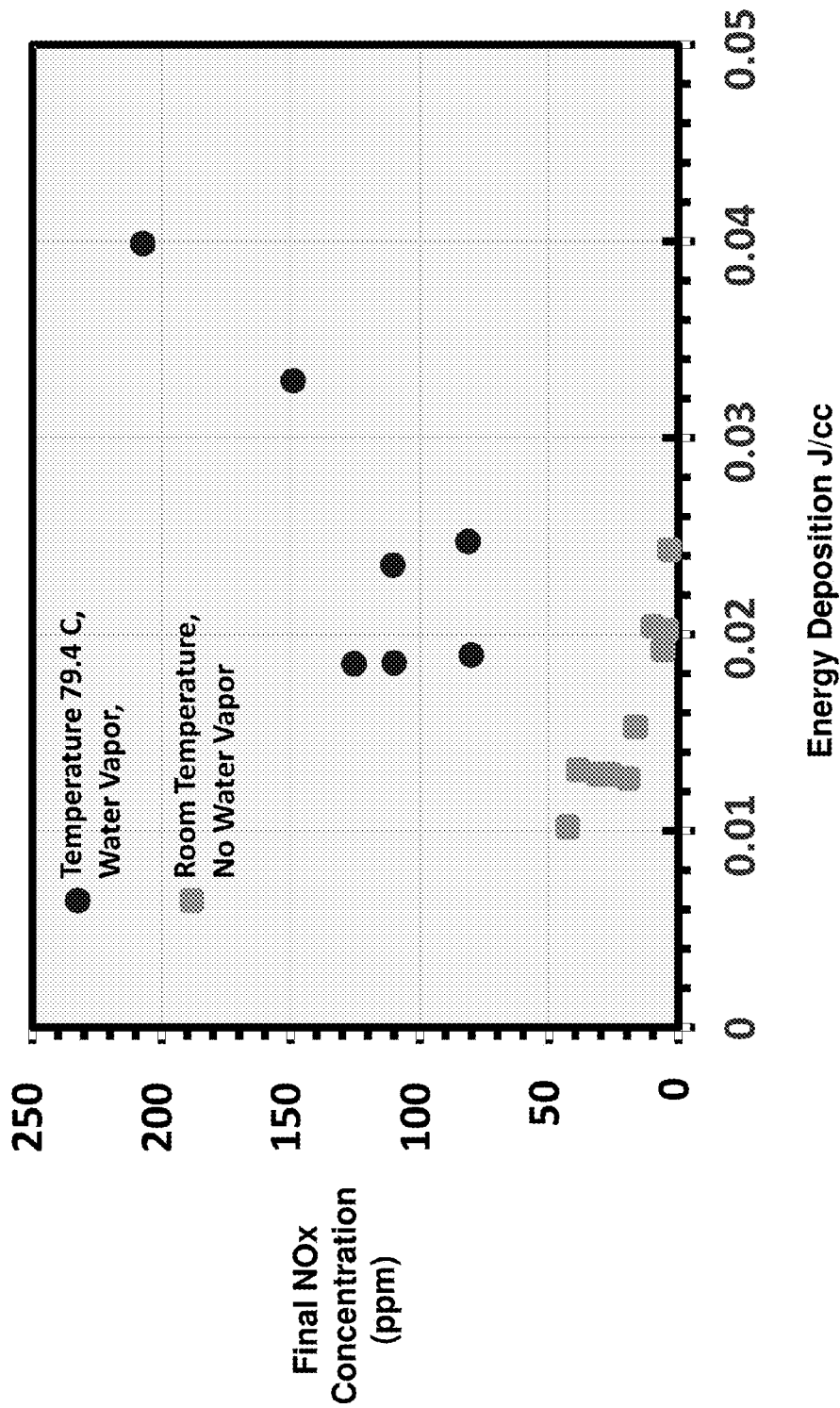
FIG. 11 is a plot illustrating aspects of $NO_x$ removal in a cooled surrogate flue gas with the removal of humidity using a single short, intense electron beam pulse in accordance with the method of the present invention.

FIG. 11 illustrates the performance of $NO_x$ removal at 79.4 C with water vapor and room temperature (21 C) without water vapor. The pulsed electron beam apparatus is substantially improved at lower temperatures and without the presence of water vapor. The effect of temperature was already illustrated in FIG. 10. Water vapor changes the chemistry of the $NO_x$ removal process by reducing the concentrations of some active species and adding species of hydroxide ions and hydrogen atoms. Limiting the water vapor concentration can be achieved by cooling the gas and allowing condensation form at the bottom of the duct and removed from the flue gas.

Figure 12:
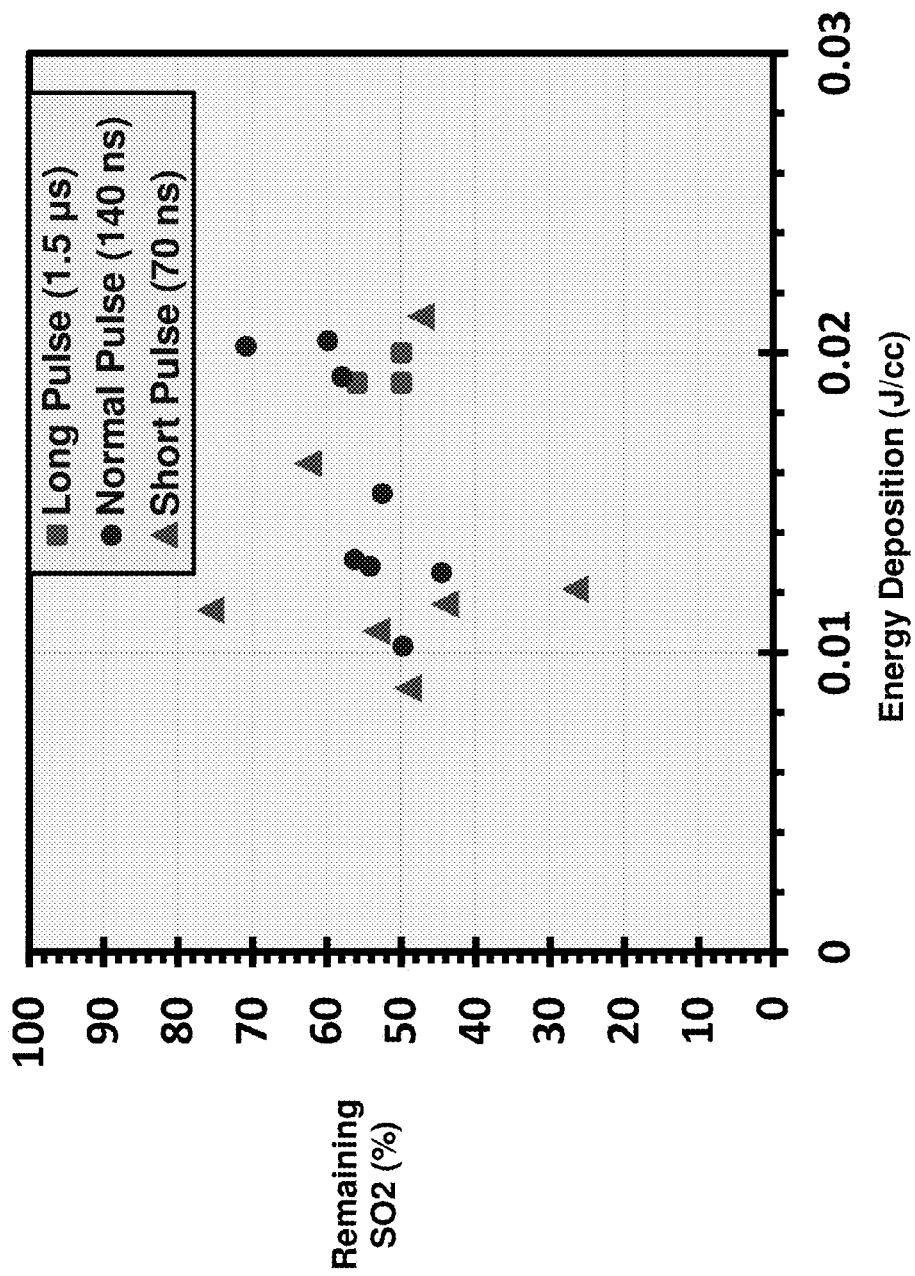
FIG. 12 is a plot illustrating aspects of removal of $SO_x$ from a surrogate combustion exhaust using a single short, intense electron beam pulse in accordance with the method of the present invention.

FIG. 12 illustrates that the method of the present invention not only reduces the concentration of $NO_x$ in the flue gas, it also reduces the concentration of $SO_2$. $SO_2$ is the primary component in $SO_x$ emissions from fossil fuel combustion plants. The pulsed electron beam approach reduces the $SO_2$ in the flue gas which is an added benefit of this method.

Thus, it has been demonstrated that the pulsed electron beam approach in accordance with the present invention can reduce $NO_x$ concentrations from 100 ppm to 30 ppm with as little as 0.0125 J/cc in a surrogate flue gas. The inventors estimate that for a full-scale 570 MWe boiler (with 2,000,000 cu ft/min exhaust flow) the total power consumption for the e-beam system would be 14.16 MW or 2.5% of the total power output by the boiler.

Advantages and New Features

The method and apparatus of the present invention provides several distinct advantages over the methods and apparatus used in the prior art.

First, the apparatus of the present invention directs the gas through the reaction chamber in one or more narrow ducts. The use of ducts allows the flow of the exhaust gas to be controlled so that it flows in a plurality of successive predetermined volumes, enabling each successive predetermined volume to be illuminated by a single short, intense electron beam pulse as it travels past a window in the duct and enables the presence of a reflective plate in the duct which can increase the energy deposited into the gas by the single pulse by reflecting some of the electrons back into the gas as it travels past the window.

The apparatus of the present invention also includes means for cooling the gas in the duct to room temperature before it is illuminated by the electron beam. As discussed above, cooling the gas to room temperature improves the effectiveness of the pulsed electron beam approach.

Another new feature and advantage of the method of the present invention is that it utilizes a single very short, intense electron beam pulse to remove the $NO_x$ from the cooled flue gas.

An additional new feature and advantage of the apparatus and method of the present invention is that the apparatus does not have any components for generating a magnetic field, as the method does not use a magnetic field to direct the electron beam into the flue gas in the duct. Removal of the magnetic field allows greater electron beam energy spreading between interaction areas within the reaction chamber. Thus, a greater treatment volume is attained without the magnetic field. In addition a design without a magnetic field allows lower capital cost foregoing purchase of magnets as well as lower operating costs foregoing the electricity needed to drive the magnets.

The apparatus and method of the present invention has two additional advantages over conventional methods known in the art. One advantage is that it uses a pulsed electron beam, which is much more efficient and inexpensive as compared to the continuous electron beam employed by many prior art methods. A second advantage is that the process of the present invention does not require the use of ammonia or any other substance as a catalyst; this simplifies both the inputs into the system and the output since the by-products of the present process are simply oxygen and nitrogen output into the atmosphere.

Although particular embodiments, aspects, and features have been described and illustrated, it should be noted that the invention described herein is not limited to only those embodiments, aspects, and features, and it should be readily appreciated that modifications may be made by persons skilled in the art.

For example, the cathode (electron beam) emitter may vary. In an exemplary embodiment, the cathode is made of array of straight carbon or polymer fibers, 2-6 mm in length that have been bonded to a conducting base. The conducting base could be made of aluminum, carbon or other conducting material. In addition, the cathode could use a secondary emitter made of honeycomb ceramic as described previously developed for cathode emission. See U.S. Pat. No. 7,429,761 entitled "High Power Diode Utilizing Secondary Emission" which issued on Sep. 30, 2008 to Moshe Friedman, Matthew Myers, Frank Hegeler, and John Sethian. Other materials such as glass ($SiO_2$) or silicon carbide could also be used for secondary emission.

In addition, the pulsed power can be based on spark gap switches, as in present Electra System developed at NRL, see J. D. Sethian, M. Myers, Ian D. Smith, V. Carboni, J. Kishi, D. Morton, J. Pearce, B. Bowen, L. Schlitt, O. Barr, and W. Webster, "Pulsed Power For A Rep-Rate, Electron Beam Pumped, Krf Laser," *IEEE Trans Plasma Sci.*, 28, 1333 (2000); or it can be based on an all solid state system, as also developed by NRL, see F. Hegeler, M. W. McGeoch, J. D. Sethian, H. D. Sanders, S. C. Glidden, M. C. Myers, "A Durable, Gigawatt Class Solid State Pulsed Power System," *IEEE Transactions on Dielectrics and Electrical Insulation*, Vol. 18, Issue 4, pp. 1205-1213, August 2011.

In addition, the pulsed power used can be based on all solid state system, see Hegeler, supra; or can be based or spark gap switches, as in present Electra System, see Sethian, supra.

The material of the hibachi foil may vary. Hibachi foils are required be thin enough to allow a substantial percentage or amount of electron beam energy to proceed through the foil as well as maintain strength to handle the pressure differential of the flue gas and low vacuum pressure in the diode. During repetitive operation cooling of the foil by the flow of the flue gas is employed in this exemplary embodiment. Other means of cooling the foil through radiation, thermal convection or thermal conduction are not precluded. Exemplary metal foils are titanium alloys, nickel based alloys including Inconel alloys and Monel alloys, aluminum alloys, cobalt alloys, and stainless steel alloys. In addition, plastics, including Kapton, can be utilized in some cases.

In addition, the method of cooling the flue gas in the duct can vary. As described above, in an exemplary embodiment cooling of the flue gas occurs by passing the flue gas through a cooled duct using water pipes wrapped around the duct. Another way to cool the gas would be to use a heat exchanger relying on heat transfer from the flue gas to a high thermal conductivity metal "fins" dispersed in the gas attached to a liquid cooling manifold. Other alternatives would be passing the flue gas through a refrigerator or adding a nonreactive coolant to the flue gas mixture where appropriate.

The number of electron beams used to uniformly irradiate flue gas can vary. In an exemplary embodiment, a pair of electron beams in a serial arrangement can be used, but any suitable number and/or configuration can be used as appropriate. The simplest arrangement is a single electron beam providing electron beam pulses with an electron beam inter-pulse time which matches as the flue gas rate from the start of the electron beam window until the end of the electron beam window. Additional electron beams in series can be utilized for systems with lower electron beam repetition rates or higher flue gas flow rates, where each of the electron beams is configured to simultaneously apply a corresponding pulsed electron beam to a corresponding volume of the exhaust gas as it travels through the reaction chamber. Using multiple electron beams in series allows greater volume treatment for a given period, but can incur larger capital costs for additional pulse power electron beam modules.

The direction of the electron beams can vary relative to the flow of the flue gas. In the exemplary embodiment the electron beam is propagating perpendicular to the flow of the gas. Alternatively, the electron beam can co-propagate with the flue gas flow or counter propagate with the flue gas flow.

In addition, in some embodiments, counter-propagating electron beams can be used, where the beams are directed through windows on opposite sides of the duct. In some embodiments in which counter-propagating electron beams are used, the counter-propagating beams will provide all of the energy directed into the exhaust gas, and no reflecting plate(s) will be present inside the duct, while in other embodiments, a reflecting plate can be present on one or both sides of the duct, e.g., either surrounding the window or otherwise situated inside the duct, to reflect the electrons from one or both of the counter-propagating electron beams and further increase the deposition of energy into the gas.

The present application contemplates any and all modifications within the spirit and scope of the underlying invention described and claimed herein, and all such combinations and embodiments are within the scope and spirit of the present disclosure.

What is claimed is:

1. A catalyst-free process for producing a scrubbed combustion exhaust having a reduced concentration of $NO_x$, comprising:
    directing a combustion exhaust containing a first concentration of $NO_x$ into a duct having a window formed in a surface thereof, the directed combustion exhaust being free from ammonia or other added catalyst;
    configuring the flow rate and the electron beam pulse rate to cause each successive volume of gas that flows past the window to be subjected to only a single electron beam pulse;
    cooling each of the successive volumes of exhuast to room temperature to produce a plurality of successive cooled volumes of exhaust that travel through the duct past the window; and
    illuminating each of the cooled volumes of exhaust with a single electron beam pulse from a pulsed electron beam source as the cooled volume of exhaust travels past the window, the electron beam pulse having a pulse width of about 70 ns and being directed into the cooled volume of exhaust without the aid of an applied external magnetic field;
    wherein the energy from the pulsed electron beam causes the $NO_x$ to dissociate into reactive radicals $N_2^+$, $N^+$, e, and $N^2$,
        the radicals combining to form neutral nitrogen N by the reactions $N_2^* \rightarrow 2N$, $N_2^+ + e \rightarrow 2N$, and $N^+ + e \rightarrow N$,
        the neutral nitrogen N combining with oxygen O and nitric acid NO from the $NO_x$ to form nitrogen $N_2$ and oxygen $O_2$ in a three-body reaction $N + NO \rightarrow N_2 + O$ and $O \rightarrow O_2$, thereby producing a scrubbed combustion exhaust containing a reduced concentration of $NO_x$;
    wherein the scrubbed combustion exhaust, the nitrogen $N_2$, and the oxygen $O_2$ are released into the atmosphere.

2. The process according to claim 1, wherein the pulsed electron beam source has a voltage of about 500,000 to about 1,000,000 Volts.

3. The process according to claim 1, wherein the pulsed electron beam source provides a current of about 100,000 to about 500,000 Amperes to the exhaust gas.

4. The process according to claim 1, wherein the duct further includes a reflective plate situated on an inner surface of the duct opposite the window such that some of the electrons from the electron beam pulse are reflected back into the exhaust to provide an additional deposition of electron energy into the exhaust.

5. An apparatus for the catalyst-free production of a scrubbed combustion exhaust having a reduced concentration of $NO_x$, comprising:
    a duct configured to receive a controlled flow of a combustion exhaust containing $NO_x$ at a first end thereof and to output a scrubbed exhaust having a reduced concentration of $NO_x$ at a second end thereof;
    cooling means at a first end of the duct, the cooling means being configured to cool the combustion exhaust to room temperature,
    a reaction chamber within the duct, the reaction chamber being configured to receive a flow of the cooled exhaust, wherein the reaction chamber has a window formed therein through which single short, intense electron beam pulse can be fired into each of the successive volumes of cooled exhaust as it travels past the window;
    a pulsed power electron beam source configured to produce the electron beam pulse directed at the cooled exhaust, the electron beam source comprising:
        a voltage source configured to produce a voltage of about 500,000 to about 1,000,000 volts to drive the pulsed electron beam through the combustion exhaust; and
        a cathode configured to be powered by the voltage source, the cathode comprising a non-thermionic cathode not requiring high temperatures for the production of the electron beam and being configured to produce the electron beam by at least one of field emission and plasma formation, the pulsed power electron beam source not including any means for generating a magnetic field; and
        a thin metal foil situated between the electron beam source and the combustion exhaust; and
    control means configured to produce a predetermined flow rate of cooled combustion exhaust through the reaction chamber, wherein each successive volume of gas that flows past the window is subjected to only a single electron beam pulse;
    wherein the single electron beam pulse from the at least one pulsed electron beam source travels through the thin metal foil and the cooled combustion exhaust as it travels past the window in the reaction chamber, the electron beam pulse depositing its energy into the gas;
    wherein the energy from the single electron beam pulse causes the $NO_x$ to dissociate into reactive radicals $N_2^+$, $N^+$, e, and $N_2$,
        the radicals combining to form neutral nitrogen N by the reactions $N_2^* \rightarrow 2N$, $N_2^+ + e \rightarrow 2N$, and $N^+ + e \rightarrow N$,
        the neutral nitrogen N combining with oxygen O and nitric acid NO from the $NO_x$ to form nitrogen $N_2$ and oxygen $O_2$ in a three-body reaction $N + NO \rightarrow N_2 + O$ and $O \rightarrow O_2$, thereby producing a scrubbed combustion exhaust containing a reduced concentration of $NO_x$;
    wherein the scrubbed combustion the nitrogen $N_2$, and the oxygen $O_2$ are released into the atmosphere at a second end of the duct.

6. The apparatus according to claim 5, wherein the reaction chamber further comprises a reflective plate situated on an inner surface of the duct opposite the window, the reflective plate being configured to reflect a plurality of electrons from the single electron beam pulse back into the exhaust gas to increase the energy deposited into the exhaust gas.

7. The apparatus according to claim 5, wherein the high voltage pulsed power supply comprises a Marx Generator.

8. The apparatus according to claim 7, wherein the Marx Generator is made from solid-state thyristors and thin film capacitors, a saturable magnetic inductor output switch, and at least one pulse forming line.

9. The apparatus according to claim 5, wherein the cathode comprises a large area cathode having a width of about 30 to 60 cm and a length of about 100 to 200 cm.

10. The apparatus according to claim 5, wherein the cathode comprises an array of straight carbon or polymer fibers bonded to a conducting base, the fibers having a length of about 2 to about 6 mm.

11. The apparatus according to claim 5, wherein the cathode is configured to produce the electron beam by one of field emission and plasma formation.

12. The apparatus according to claim 5, wherein the thin metal foil comprises stainless steel, titanium, or a titanium alloy.

13. The apparatus according to claim 5, wherein the thin metal foil has a thin coating to prevent a chemical interaction between the metal foil and the exhaust gas.

14. The apparatus according to claim 5, wherein the apparatus comprises a plurality of electron beam sources arranged in series along the reaction chamber, each of the plurality of electron beam sources being configured to simultaneously apply a corresponding pulsed electron beam to a corresponding volume of the exhaust gas as it travels through the reaction chamber.

15. The apparatus according to claim 5, wherein the thin metal foil is held in place by an array of support ribs, and wherein the electron beam source is configured to emit the electron beam so that it propagates between the support ribs.

16. A catalyst-free process for producing a scrubbed combustion exhaust having a reduced contaminant concentration, comprising:
   directing a combustion exhaust containing a first concentration of at least one contaminant into a duct having a window formed in a surface thereof, the directed combustion exhaust being free from ammonia or other added catalyst;
   configuring the flow rate and the electron beam pulse rate to cause each successive volume of gas that flows past the window to be subjected to only a single electron beam pulse;
   cooling each of the successive volumes of exhaust to room temperature to produce a plurality of successive cooled volumes of exhaust that travel through the duct past the window;
   illuminating each of the cooled volumes of exhaust with a single short, intense electron beam pulse from a pulsed electron beam source as the cooled volume of exhaust travels past the window, the electron beam pulse being directed into the cooled volume of exhaust without the aid of an applied external magnetic field;
   wherein the energy from the pulsed electron beam causes a chemical reaction in the contaminant that converts the contaminant into at least one benign component to produce a scrubbed combustion exhaust containing a reduced concentration of the contaminant;
   wherein the scrubbed combustion exhaust and the benign component are released into the atmosphere.

* * * * *